Figures 1, 2:
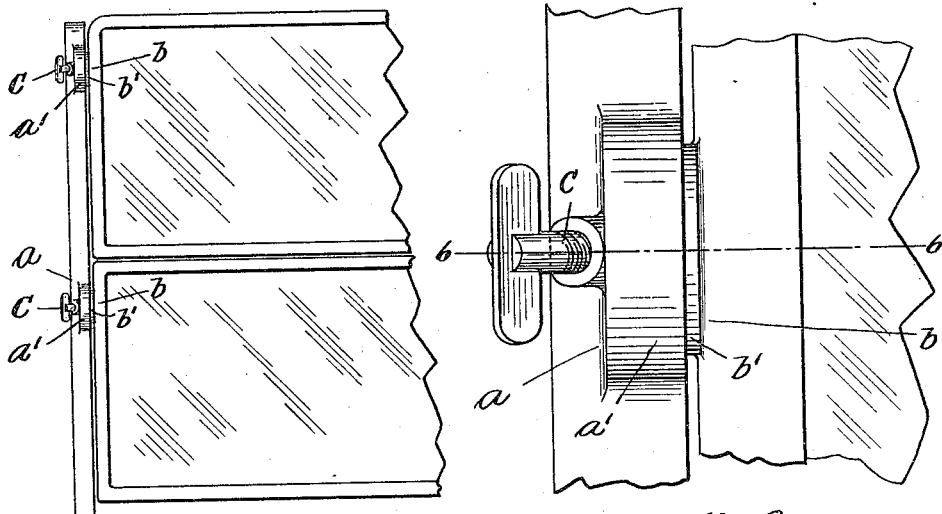

S. R. BAILEY.
LOCK JOINT FOR WIND SHIELDS.
APPLICATION FILED APR. 11, 1916.

1,214,260.

Patented Jan. 30, 1917.

Witness.
H. B. Davis.

Inventor.
Samuel R. Bailey
by Rogers & Hammond
Attys.

UNITED STATES PATENT OFFICE.

SAMUEL R. BAILEY, OF AMESBURY, MASSACHUSETTS.

LOCK-JOINT FOR WIND-SHIELDS.

1,214,260.

Specification of Letters Patent. Patented Jan. 30, 1917.

Application filed April 11, 1916. Serial No. 90,466.

*To all whom it may concern:*

Be it known that I, SAMUEL R. BAILEY, a citizen of the United States, residing at Amesbury, in the county of Essex and State of Massachusetts, have invented an Improvement in Lock-Joints for Wind-Shields, of which the following is a specification.

This invention relates to certain improvements in lock joints especially adapted for automobile wind shields, and particularly to certain improvements on the device disclosed in my prior Patent, #1,171,829, dated February 15, 1916. In my said prior device, the locking screw is arranged to move into wedging engagement with the bearing surface of the trunnion, to press the trunnion into a recess formed in the trunnion-bearing, and lock the same against rotation. While this arrangement has various features of advantage, it also has been found to have certain features of disadvantage, for several reasons, some of which are as follows:—The action of the locking screw directly on the bearing surface of the trunnion is liable to cause indentations therein, and corresponding irregular projections thereon, and these irregularities are liable to mar the bearing surface of the member in which the trunnion is rotatably mounted, and make it difficult to lock the wind shield except in certain positions, or to adjust the screw so that the movement of the joint members may be against a constant friction of any desired extent. Further, the wedging action of the screw in forcing the trunnion into the recess leading from the bearing frequently does not act in a direction which enables the resulting force to operate to the best advantage, on account of the fact that the point of engagement of the locking screw with the trunnion varies to some extent, so that the pressure of the screw is not directed in the radial line which bisects the recess. Also, as both of the frictionally-engaged surfaces are convex, the area of the surfaces engaged is small, while the tendency to cause indentation of said surfaces is increased. The object of my invention is to obviate the objectionable features of my prior construction, above referred to, and, at the same time, to retain all the advantageous features thereof, and to produce a joint in which the members thereof may be rigidly locked by a comparatively light pressure of the fingers on the locking screw, by means of which the force of the frictional engagement may be readily and accurately varied. I accomplish these objects primarily by providing the trunnions of the movable member with a tubular end-portion and arranging the locking screw on the fixed member in a position to engage the inner periphery of said tubular end-portion, so that the surface engaged by the locking screw is independent of the bearing surface of the trunnion, and a convex surface engages a concave surface, thereby increasing the area of the surface engaged.

For a more complete understanding of my invention, reference is made to the accompanying drawing, in which:—

Figures 3, 4, 5:
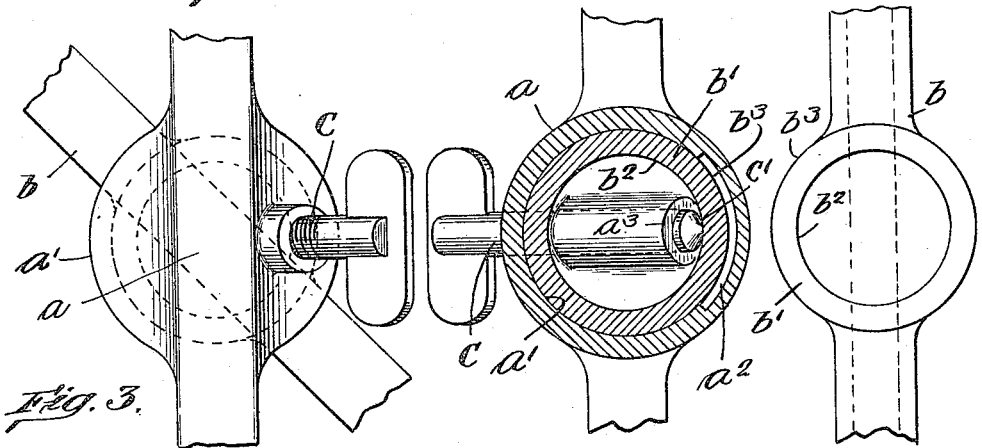
Figure 6:
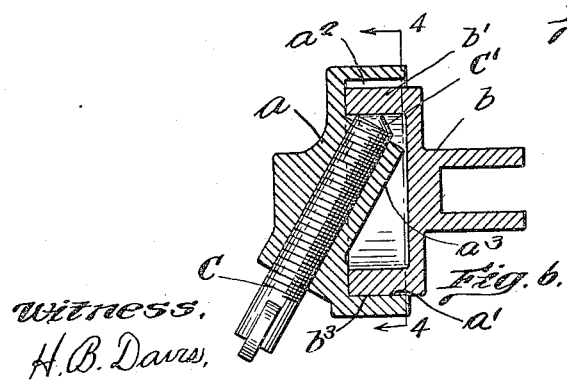

Figure 1 is a front elevation of a portion of an automobile wind shield provided with a lock joint embodying my invention. Fig. 2 is a front elevation of the joint, and, Fig. 3 is a side elevation thereof. Fig. 4 is a sectional view on the line 4—4 of Fig. 6. Fig. 5 is a detail view of the trunnion member, and, Fig. 6 is a sectional view on the line 6—6 of Fig. 2.

While it is immaterial which member of the joint is fixed and which is movable, for the purposes of convenience in description in the following specification and claims, the member shown as fixed is referred to as the "fixed" member, and the other, as the "movable" member. It will, however, be understood that the invention is not limited to the employment of either member as the fixed member.

As shown in the drawing, the fixed member $a$ is mounted on the standard of the wind shield support and the movable member $b$ on the shield, the member $a$ having a circular bearing cup $a'$ formed therein to receive a corresponding trunnion $b'$, which projects from said movable member and extends into said cup. Said trunnion is made tubular, or a cylindrically shaped recess is formed in said trunnion, which leads from the projecting end thereof, providing the trunnion with an inner peripheral surface $b^2$ which is concentric with the outer or bearing surface $b^3$ thereof.

A locking screw $c$ is provided which is arranged to extend through the bottom of the cup $a'$ of the fixed member in such a direction that its axis intersects the axis of the trunnion at an oblique angle, the end of said screw being provided with a conical face $c'$, the elements of the surface of which lie at the same angle to the axial line of the screw, as that at which the axial line of the screw lies to the axis of the trunnion, the arrangement being such that, when the parts are in position, and said screw is forced inwardly to a sufficient extent, the conical face $c'$ of the screw will be brought into engagement with the inner peripheral face $b^2$ of the trunnion, so that an element of the face $c'$ will lie flat against, or is practically coincident with, an element of the face $b^2$. As in the device of my said prior patent, the bearing cup for the trunnion is provided with a recess $a^2$, which leads from the bearing surface thereof and extends throughout approximately one-fourth of the circumference of said recess, or throughout somewhat less than a semi-circumference, said recess being so arranged with relation to the locking screw that the plane, in which the axes of the screw and of the trunnion lie, intersects the wall of the bearing cup midway between the ends of said recess, or bisects it. The bottom of the cup $a'$ is provided with an obliquely disposed boss which extends about the screw $c$ to provide an ample bearing to hold the screw from springing laterally at points in as close proximity as practicable to the conical end thereof.

When the trunnion $b'$ is in position in the cup $a'$, the end of the trunnion bears against the bottom of the cup, while it may rotate freely on its interior wall as a bearing. When the screw $c$ is forced inwardly, the conical end $c'$ thereof will be forced against the inner peripheral face $b^2$ of the trunnion, causing frictional engagement therebetween, which will obstruct rotation of the trunnion to an extent dependent on the force with which the screw engages said face. The pressure of the screw against the inner peripheral surface of the trunnion also causes the trunnion to be forced to some extent into the recess $a^2$, so that the trunnion is caused to bear with equal force against the portions of the bearing surface adjacent each end of the recess. As a result, a strong frictional engagement is caused between the two members at three points, a convex surface being forced against a concave surface in each instance, so that the members may be firmly locked against relative rotation, and, as the screw does not act directly against the bearing surface of the trunnion, all danger that such surface will be marred is avoided, while at the same time, the set screw operates in a direction to cause the trunnion to be forced into the exact center of the side recess of the cup, without being forced more to one side thereof than to the other, so that the locking effect thereof at each side of the recess, will always be equal, and be secured to the best advantage, under all conditions. In case the walls of the trunnion should spring slightly under the action of the screw, the locking effect of the bearing portions at each side of the recess will be in no way impaired and will possibly be increased.

The construction is simple and unlikely to get out of order, and the frictional effect which is secured, is so great, that the parts may be lubricated without substantially detracting from their efficiency.

I claim:—

1. A joint comprising a bearing-member, a trunnion exteriorly journaled therein, said trunnion being tubular at one end to provide an interiorly disposed clamping surface within its bearing surface, and a locking device held against rotation by said bearing-member and arranged to be forced against said clamping face, in a direction to press said trunnion laterally in its bearing.

2. A joint comprising a bearing-member, a trunnion exteriorly journaled therein, said trunnion being tubular at one end to provide an interiorly disposed clamping surface within its bearing surface, and a clamping screw threaded in said bearing-member and arranged to cause frictional engagement between its end and said clamping face and to press the trunnion laterally in its bearing.

3. A joint comprising a bearing member, a trunnion journaled therein having an internal face disposed concentrically with its bearing face, and a screw threaded in said bearing member transversely of the axis of the trunnion, and in position to be frictionally engaged with said internal face.

4. A lock joint comprising a fixed and a movable member, a trunnion on said movable member journaled in said fixed member and having a tubular end-portion constructed to provide a circular face on its inner periphery concentric with the axis thereof, and a locking screw threaded in said fixed member in position to extend obliquely to said axis into said tubular end-portion, to engage said face.

5. A lock joint comprising a fixed and a movable member, said fixed member having a bearing cup therein, a trunnion on said movable member having a tubular end-portion extending into, and mounted for rotation in said cup, and a locking screw mounted in said fixed member and extending obliquely through the bottom of said cup in position to engage the inner periphery of the tubular end-portion of the trunnion.

6. A lock joint comprising a fixed and a movable member, said fixed member having a bearing cup therein, a trunnion on said movable member having a tubular end-portion extending into, and mounted for rotation in said cup, and a locking screw extending through the bottom of said cup in a direction oblique to the axis of the trunnion and having a conical face at its end arranged to engage the inner peripheral surface of said trunnion in parallel relation.

7. A joint comprising a fixed member having a bearing cup therein, said cup having a recess leading from its bearing surface and extending throughout a portion thereof less than a circumference, a movable member having a trunnion projecting therefrom and journaled in said cup, said trunnion having its end-portion hollow to provide an internal face concentric with its bearing surface, and a locking screw threaded in said fixed member and extended through the bottom of said cup in position to engage the internal face of the trunnion, and to press the trunnion into said recess and against the bearing surface of the cup at each end of said recess.

8. A joint comprising a fixed member having a bearing cup therein, said cup having a recess leading from its bearing surface and extending throughout a portion thereof less than a circumference, a movable member having a trunnion projecting therefrom and journaled in said cup, said trunnion having the end-portion thereof hollow, to provide an internal, circular face concentric with its bearing surface, and a locking screw, having a conical engaging face at its end, disposed to pass through the bottom of said cup to bring its face into engagement with said internal face of the trunnion, and arranged in a position in which its axis intersects the axis of the trunnion at an inclination corresponding to the inclination of its engaging face, and lies in the plane of the axis of the trunnion which bisects the said recess of the cup, so that the trunnion may be forced into said recess by the pressing action of the screw.

9. A joint comprising a fixed and a movable member, said fixed member having a bearing cup therein, a trunnion on said movable member having a tubular end-portion extending into, and mounted for rotation in said cup, a projection extending from the bottom of the cup into said trunnion, and a locking screw extending obliquely through the bottom of the cup and through said projection in position to engage the inner periphery of the trunnion.

10. A joint comprising a fixed and a movable member, a trunnion on said movable member journaled in said fixed member, and having an internally-disposed concave face, a locking screw having a convex engaging face at its end, and threaded in said fixed member in position to extend into said trunnion and force its end face into engagement with the concave face of the trunnion.

In testimony whereof, I have signed my name to this specification.

SAMUEL R. BAILEY.

Witness:
L. H. HARRIMAN.

Copies of this patent may be obtained for five cents each, by addressing the "Commissioner of Patents, Washington, D. C."